Patented Feb. 6, 1934

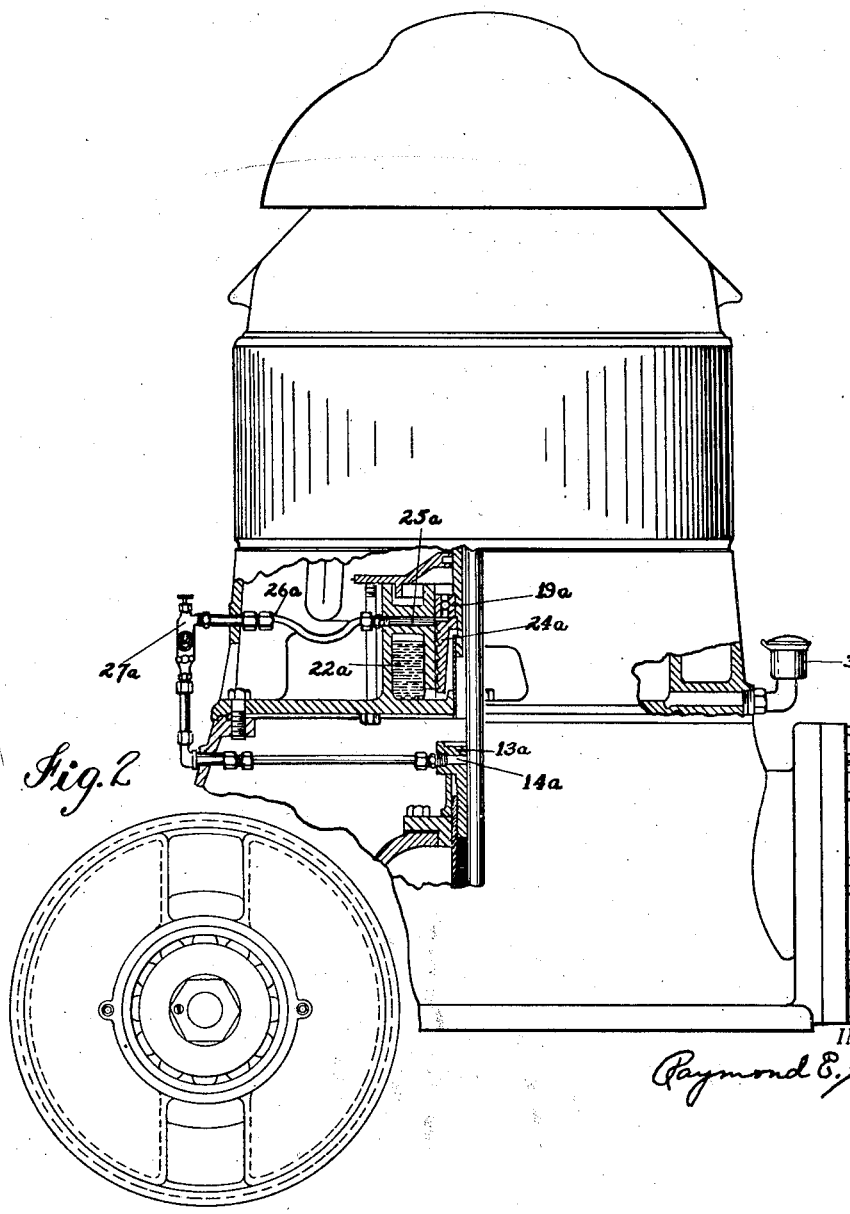

1,945,833

UNITED STATES PATENT OFFICE 1,945,833

DEEP WELL TURBINE PUMP HEAD AND LUBRICATING SYSTEM THEREFOR

Raymond E. Swanson, Lawrenceburg, Ind., assignor to A. D. Cook, Inc., Lawrenceburg, Ind., a corporation of Indiana Application November 26, 1929
Serial No. 409,940

1 Claim. (Cl. 308—168)

My invention relates to automatic oiling systems for deep well turbine pump head assemblies in which lubricant is provided in a reservoir and distributed therefrom automatically to one or both of the motor bearings and to the line shaft bearings.

Deep well turbine pumps are ordinarily of the enclosed line shaft type. This construction consists of a well casing. Within the casing there is a column pipe through which the liquid pumped is forced from the pump which is at the bottom of the column to the surface. Within the column there is ordinarily an oil tube which encloses the line shaft. The line shaft extends down through the tube and connects the pump with the source of power. The oil tube is provided with internal couplings which, in most cases, provide bearings for the line shaft. The couplings of the line shaft are small enough to fit within the oil tube.

To lubricate the line shaft bearings it has in the past been suggested that a sight feed or force feed lubricating system be provided which forced lubricant through the top line shaft bearing from which it flows down along the line shaft and lubricates the other line shaft bearings.

The motors in such installations are ordinarily of the vertical shaft type, and it has been customary to provide oil cups to lubricate both the upper and the lower bearings. The upper end of the motor shaft usually has a radial thrust ball bearing while the other end may have either a radial ball bearing or a sleeve bearing.

The lubricating systems hereinbefore referred to have proved unsatisfactory unless given careful inspection. Due to the locations of most deep well installations, lubricating devices which require frequent inspection prove unsatisfactory from the point of view of the labor required, and because if the engineer is not very careful the line shaft bearings are liable to be allowed to go unlubricated, when they will very likely burn out, causing very expensive repairs.

It is the object of my invention to provide a lubricating system for a turbine head assembly which will automatically take care of all lubricating requirements about the assembly. While ordinarily it will be found advantageous to supply both the upper and lower motor shaft bearings with lubricant, and also the line shaft bearings, it is possible to provide the upper motor shaft bearing with an independent reservoir. In most motors this reservoir is of sufficient capacity so that the bearing requires practically no attention except an occasional refilling of the oil reservoir.

As has been noted, it is my object to provide all the bearings, the motor bearings and the line shaft bearings, with lubricant from a central reservoir, but in the appended claim the elements included in the combinations claimed will include only one of the motor bearings, as this constitutes the gist of my invention.

The above and other objects to which reference will be made in the ensuing description I accomplish by that certain combination and arrangement of parts of which I have shown several preferred modifications.

Referring to the drawings:—

Figure 2 is a plan view of the lubricant reservoir shown in Figure 1, with the cover cap of the assembly removed.

Figure 3 is a side elevation with parts in section of a motor head assembly in which the lubricating system automatically lubricates the lower motor shaft bearings and the line shaft bearings, the upper motor shaft bearings being lubricated by an individual lubricator.

Figure 1:
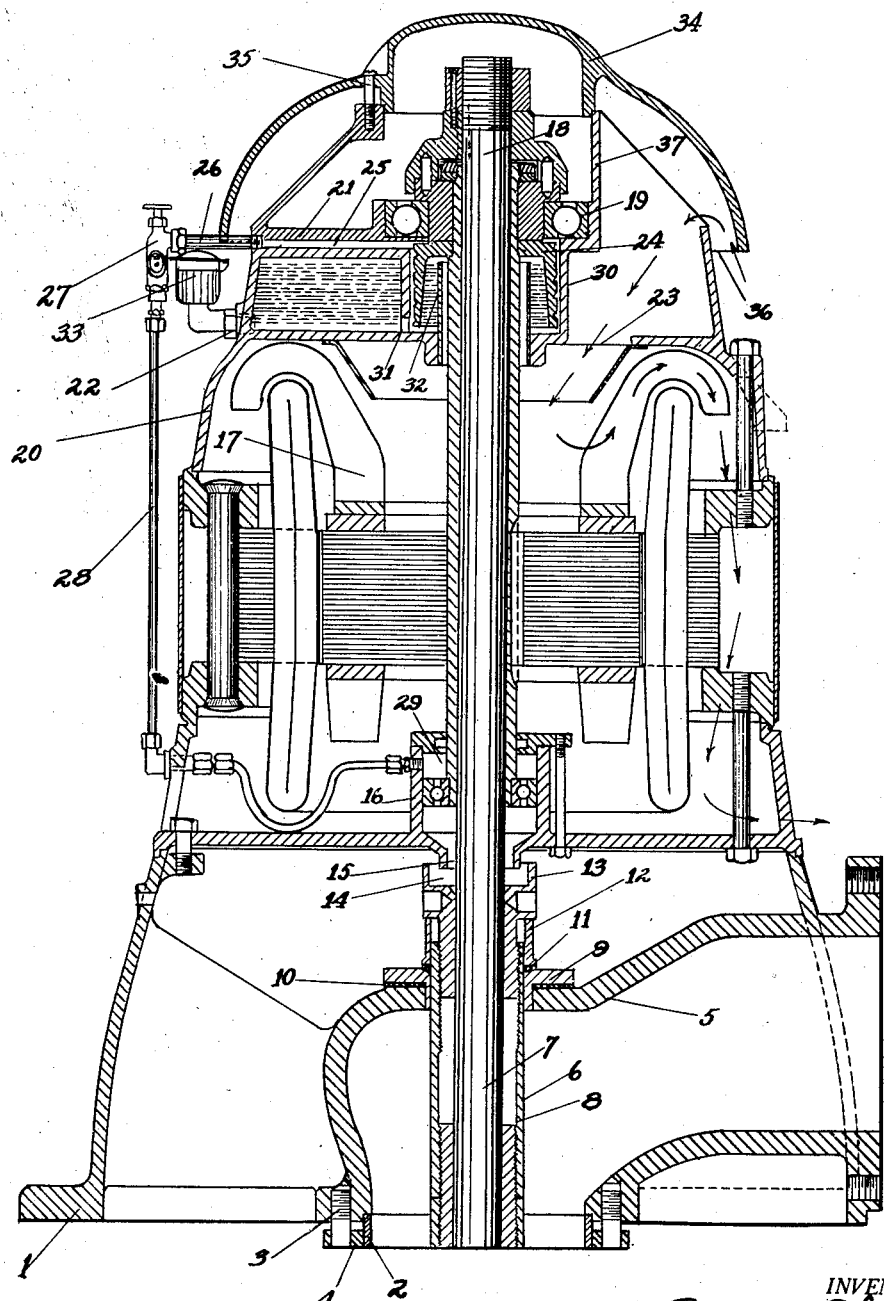
Figure 1 is a sectional view of a turbine head assembly in which both the upper and lower motor shaft bearings are lubricated from a central source, and the line shaft bearings are likewise lubricated from this central reservoir.

Referring first to Figures 1 and 2, I have shown the base 1. Bolted to the base I have shown the column 2 supported on the base as with bolts 3 which pass through flanges 4 secured to the column. The discharge passage 5 extends up through the base and the fluid pumped passes up through the column and is discharged through this passage 5. The oil tube is indicated at 6, and within the oil tube is the line shaft 7. A line shaft bearing is indicated at 8, and it will be understood that between the line shaft and the oil tube these bearings 8 are provided at spaced intervals.

The discharge tube 5 has an opening at its upper end through which the oil tube passes, a sealed joint being provided by an oil tube adaptor 9 and a gasket 10. The oil tube is further packed with oil tube packing 11, the oil tube packing gland 12, and the gland nut 13. The gland nut is provided with a hollow cup-shaped recess 14 into which lubricant flows from an annular opening 15 at the base of the lower motor shaft bearing casing 16. The motor is indicated at 17 and may be of desired type. The upper end 18 of the motor shaft has a radial thrust ball or roller bearing 19. The motor is enclosed within a casing 20 and the bearing 19 is supported on a bar 21 cast across the casing. The casing is further provided with an oil reservoir 22 which has passageways 23 formed in its walls to permit the circulation of air in and around the motor.

For inducing the circulation of oil from the reservoir to the various bearings of the assembly, I have mounted on the motor shaft a spiral pump 24. This spiral pump may have either right or left hand spiralled grooves, or both, depending on whether or not the motor shaft rotates in a clockwise or counterclockwise direction.

The oil pump raises the level of the lubricant within the reservoir above its normal static level, forcing it up through the upper motor shaft roller or ball bearing. A passage 25 extends through the head to a tube 26 on which is mounted a sight feed control valve 27 which regulates the supply of oil which passes through the tube 28 and into the upper chamber 29 of the lower motor shaft bearing housing. The oil pump 24 fits rather snugly in an annular wall 30 in the lubricant reservoir. A passage 31 is provided at the base of the reservoir through which lubricant will be drawn to the pump. The inner periphery of the pump is made slightly tapering so that the centrifugal action of the oil will have a tendency to lower the level inside the pump. The oil level bushing 32 is pressed into the pump chamber and prevents any lubricant from running over and flowing down along the motor shaft. The oil reservoir is provided with an oil filler cup 33 arranged at such a level that it will over-flow when the maximum oil level is reached.

The average turbine pump requires only from two to five drops of lubricant per minute, and as I have provided such a large reservoir, refilling will be required only at very infrequent intervals.

In addition to being automatic, I have provided a cover 34 mounted on the reservoir casing and secured in position as with an adjustment screw 35. The reservoir cover member extends into overlapping position relative to the reservoir casing, so that a passage 36 is provided through which air will circulate down through the passage 23 and around the motor.

The operation of the lubricating system described will be obvious. Lubricant is poured into the filler cup 33 until it over-flows, indicating that the proper level in the reservoir has been reached. When the motor is started the pump forces lubricant up along the inner surface of the walls 30. The bearing 19 is directly lubricated, and any excess lubricant which flows out through the top of the bearing runs back down into the reservoir. A wall 37 prevents any overflowing oil from flowing down into the passage 23. Through the passage 25 lubricant flows to the sight feed valve 27, which, as has been noted, controls the lubrication of the lower motor shaft bearing and of the overflow from it to the line shaft bearings. The construction is weatherproof and may be installed in the open without any protection, and due to the automatic control of lubrication will require very infrequent inspection.

The assembly shown in Figure 3 is similar in principle to that shown in the other figures, excepting that the reservoir is mounted below the motor. Thus I have provided the reservoir 22a from which lubricant flows to the pump 24a. A filler cap 33a is provided and the discharge from the pump passes to the lower motor shaft bearing 19a. A passage 25a supplies a pipe 26a and a sight feed valve 27a controls the flow of lubricant to a passage 14a in the oil tube nut 13a. As will be understood from Fig. 3, the pipe 26a is provided intermediate its length with a downward dip or generally U-shaped portion. The inner leg of this U-shaped portion has the function of providing a passage in which any air entrapped in the oil can flow generally upwardly as the result of the action of gravity upon the oil. Any such air flows inwardly and upwardly against the direction of oil-flow and escapes. Were it not for the downwardly and outwardly extending inner portion of the dip in the pipe 26a, any air included in the oil discharged from the pump 24a would be carried along with the outwardly flowing oil and would collect in the sight-feed valve 27a until that valve became air-bound.

The operation of the system disclosed in Figure 3 will be similar to that of the system shown in Figures 1 and 2, the only difference being that the upper motor shaft bearing in the assembly shown in Figure 3 must be provided with an independent lubricator.

Having thus described my invention, what I claim as new and desire to secure by Letters Patent, is:—

In combination in a deep well pump assembly including a line shaft having a line-shaft bearing, a lubricant reservoir located above said line-shaft bearing, a pump for elevating lubricant from said reservoir, an upwardly extending passage arranged to receive lubricant discharged from said pump and having a lubricant discharge opening near its top, a conduit connected to said passage at a point below said discharge opening and including a portion which extends generally downwardly in the direction of lubricant-flow, whereby any air entrapped in the lubricant entering said conduit can flow generally upwardly in the downwardly extending portion thereof and escape through said passage and discharge opening, a valve into which said conduit discharges, and means for conveying lubricant from said valve to said line-shaft bearing.

RAYMOND E. SWANSON.